United States Patent
Nakamura et al.

(10) Patent No.: US 8,854,682 B2
(45) Date of Patent: Oct. 7, 2014

(54) IMAGE PROCESSING APPARATUS AND PROCESSING PROGRAM FOR ARRANGING MANUSCRIPT DATA ON FOLDED SHEETS

(75) Inventors: Takahiko Nakamura, Ibaraki-ken (JP); Ayako Kawano, Ibaraki-ken (JP); Kouichi Nobushima, Ibaraki-ken (JP); Toshio Akiyama, Ibaraki-ken (JP); Masaki Ozawa, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 394 days.

(21) Appl. No.: 13/361,780

(22) Filed: Jan. 30, 2012

(65) Prior Publication Data
US 2012/0194828 A1 Aug. 2, 2012

(30) Foreign Application Priority Data

Jan. 31, 2011 (JP) ................. 2011-018291

(51) Int. Cl.
*G06K 15/02* (2006.01)
*G06K 15/00* (2006.01)
*G03G 15/36* (2006.01)
*G03G 15/00* (2006.01)
*H04N 1/00* (2006.01)

(52) U.S. Cl.
CPC ...... *G03G 15/36* (2013.01); *G03G 2215/00877* (2013.01); *H04N 1/00639* (2013.01)
USPC ............................ 358/1.18; 358/1.2; 399/407

(58) Field of Classification Search
CPC .............. H04N 1/00639; G03G 15/36; G03G 2215/00877
USPC .................................. 358/1.2, 1.18; 399/407
See application file for complete search history.

(56) References Cited

U.S. PATENT DOCUMENTS

| 4,627,707 | A * | 12/1986 | Tani et al. ................. 399/184 |
| 7,072,070 | B2 * | 7/2006 | Masaki ................... 358/1.18 |
| 7,679,775 | B2 * | 3/2010 | Tsukuba et al. ........... 358/1.18 |
| 7,969,607 | B2 * | 6/2011 | Masaki ................... 358/1.18 |
| 8,564,826 | B2 * | 10/2013 | Morooka ................. 358/1.2 |
| 2002/0186983 | A1 * | 12/2002 | Asai ...................... 399/82 |
| 2005/0207812 | A1 * | 9/2005 | Miyazaki ................. 399/407 |
| 2008/0106029 | A1 * | 5/2008 | Shida et al. .............. 271/207 |
| 2009/0111672 | A1 * | 4/2009 | Takahashi et al. ......... 493/37 |
| 2009/0290177 | A1 * | 11/2009 | Shibano et al. ........... 358/1.9 |
| 2010/0165407 | A1 * | 7/2010 | Witkowski et al. ........ 358/1.18 |

FOREIGN PATENT DOCUMENTS

JP 2009-003572 A 1/2009

* cited by examiner

*Primary Examiner* — Fred Guillermety
(74) *Attorney, Agent, or Firm* — Studebaker & Brackett PC

(57) ABSTRACT

An image processing apparatus that prints a plurality of manuscript data onto sheets and folds the printed sheets into N (2≤N) equally sized divisions is equipped with: a manuscript size obtaining section that obtains sizes of the manuscript data; a reference size obtaining section that obtains a first reference size, set based on a unit size equal to the size of the sheets divided into N divisions, and M reference sizes, set based on the unit size multiplied by M (2≤M≤N); and an arrangement setting section that arranges manuscript data of the reference size or less at single surfaces from among a plurality of printing surfaces of the sheets formed by the sheets being folded, and arranges manuscript data of an (M−1)th reference size or greater and an Mth reference size or less at M continuous surfaces from among the plurality of surfaces.

5 Claims, 10 Drawing Sheets

FIG.19

# IMAGE PROCESSING APPARATUS AND PROCESSING PROGRAM FOR ARRANGING MANUSCRIPT DATA ON FOLDED SHEETS

BACKGROUND OF THE INVENTION

1. Field of the Invention

The present invention is related to an image processing apparatus and an image processing program that sets arrangements of manuscript data in cases that a plurality of sets of manuscript data (image data) are printed onto sheets, and the printed sheets are divided and folded into N (N is a natural number greater than or equal to 2) equally sized divisions.

2. Description of the Related Art

Recently, so called finishing functions of printing apparatuses, such as folding printed sheets and binding printed sheets into books, are becoming more robust. There are various methods by which the finishing function folds sheets, such as half fold, inner third fold, outer third fold (Z fold), and inner quarter fold (French window fold).

Manuscript data which are printed onto sheets to be folded in such manners are generated by employing applications and the like installed in computers. There are cases in which manuscript data are generated at a ⅓ of the size of the sheets (single surface size) such that different sets of manuscript data are printed on each of a plurality of surfaces that are generated by the sheets being folded in thirds, for example. Japanese Unexamined Patent Publication No. 2009-003572 discloses a printing control apparatus that automatically arranges a plurality of sets of manuscript data which are generated to be of single surface sizes with respect to sheets which are to be folded into thirds.

There are cases in which printed matter which are folded into thirds having one set of manuscript data printed on a single surface and a set of manuscript data printed on two or three continuous surfaces are desired. In this case, it is necessary for an application to generate sets of manuscript data having different sizes: a single surface size, a size twice the single surface size (double surface size), and a size three times the single surface size (triple surface size).

The printing control apparatus of Japanese Unexamined Patent Publication No. 2009-003572 that arranges sets of manuscript data within single surfaces cannot be applied to generate printed matter which are folded into thirds having sets of manuscript data to be arranged within two or three continuous surfaces. In the case that such folded printed matter are to be generated, the bothersome operation of manually performing imposition processes for each set of manuscript data becomes necessary.

SUMMARY OF THE INVENTION

The present invention has been developed in view of the foregoing circumstances. It is an object of the present invention to provide an image processing apparatus and an image processing program which are capable of arranging sets of manuscript data within regions of sheets suited to the sizes thereof, when a plurality of sets of manuscript data are printed onto the sheets and the printed sheets are folded and divided into a plurality of surfaces having approximately the same sizes.

An image processing apparatus of the present invention is an image processing apparatus that sets arrangements of a plurality of pieces of manuscript data within sheets in the case that the plurality of pieces of manuscript data are printed onto the sheets and each of the printed sheets is folded into N (N represents a natural number greater than or equal to 2) equally sized divisions, comprising:

a manuscript size obtaining section that obtains the sizes of the pieces of manuscript data;

a reference size obtaining section that obtains a first reference size, which is set based on a unit size equal to the size of one of the N equally sized divisions, and Mth reference sizes, which are set based on a size obtained by multiplying the unit size by M (M represents natural numbers greater than or equal to 2 and less than or equal to N); and an arrangement setting section that arranges pieces of manuscript data having sizes, obtained by the manuscript size obtaining section, less than or equal to the first reference size at single surfaces from among a plurality of surfaces which are formed on printing surfaces of the sheets by the sheets being folded, and arranges pieces of manuscript data having sizes, obtained by the manuscript size obtaining section, greater than an (M−1)th reference size and less than or equal to an Mth reference size at M continuous surfaces from among the plurality of surfaces, to set the arrangement of the plurality of pieces of manuscript data within the sheets.

The phrase "sheets are divided . . . into N equally sized divisions" refers to sectioning the sheets in the vertical direction into N parts having approximately the same size.

As described above, M represents natural numbers greater than or equal to 2 and less than or equal to N. Therefore, "obtaining . . . M reference sizes, which are set based on sizes which are the unit size multiplied by M" refers to obtaining a second reference size, which is set based on twice the unit size, a third reference size, which is set based on three times the unit size, . . . and an Nth reference size, which is set based on N times the unit size.

The phrase "arranges pieces of manuscript data having sizes . . . greater than an (M−1)th reference size and less than or equal to an Mth reference size at M continuous surfaces from among the plurality of surfaces" means that pieces of manuscript data having a size greater than the first reference size and less than or equal to the second reference size are arranged within two continuous surfaces from among the plurality of surfaces, pieces of manuscript data having a size greater than the second reference size and less than or equal to the third reference size are arranged within three continuous surfaces from among the plurality of surfaces, . . . and pieces of manuscript data having a size greater than the (N−1)th reference size and less than or equal to the Nth reference size are arranged within N continuous surfaces from among the plurality of surfaces.

The phrase "sizes of the pieces of manuscript data" refers to the lengths of the pieces of manuscript data in the vertical direction and the horizontal direction. That the size of a piece of manuscript data is less than or equal to the first reference size means that the length of the piece of manuscript data in the vertical direction is less than or equal to the length of the first reference size in the vertical direction, and the length of the piece of manuscript data in the horizontal direction is less than or equal to the length of the first reference size in the horizontal direction. That a piece of manuscript data has a size greater than the (M−1)th reference size and less than or equal to the Mth reference size means that the length of the piece of manuscript data in the vertical direction is greater than the length of the (M−1)th reference size and less than or equal to the length of the Mth reference size in the vertical direction, and the length of the piece of manuscript data in the horizontal direction is less than or equal to the length of the Mth reference size in the horizontal direction.

The first reference size may be the aforementioned unit size, or a size, which is the unit size plus a predetermined value. The Mth reference size may be a size M times the unit size, or a size M times the unit size plus a predetermined value.

The phrase "printing surfaces of the sheets" refers to the inner and/or outer surfaces of the sheets, which are determined in advance to be surfaces to be printed on.

The phrase "continuous surfaces" refer to surfaces of the sheets which are continuous in a state in which the sheets are folded or in a state in which the sheets are folded in a specific manner.

A configuration may be adopted, wherein the arrangement setting section is that which changes the order that the pieces of manuscript data are arranged and performs arrangement such that one of the pieces of manuscript data is arranged in blank surfaces, in the case that blank surfaces, in which manuscript data are not arranged, are generated by the arrangement setting section arranging the plurality of pieces of manuscript data in their sequential order. The change in the order of arrangement may be performed within a predetermined range of arrangement orders.

The image processing apparatus of the present invention may further comprise a display section that displays preview images; and a preview image display control section that generates the preview images that represent states in which the plurality of pieces of manuscript data are arranged on the printing surfaces according to the arrangement of the plurality of pieces of manuscript data set by the arrangement setting section and controls the display section such that the generated preview images are displayed by the display section.

In this case, the image processing apparatus may further comprise:

an operating section for receiving operation commands from users regarding the displayed preview images; wherein:

the arrangement setting section changes the arrangement of the plurality of pieces of manuscript data within the sheets according to the operation commands of the users received by the operating section; and the preview display control section generates preview images that reflect the change to the arrangement and causes the display section to display the newly generated preview images.

The preview images may be those that represent states in which the sheets are folded. Here, the states in which the sheets are folded may be directly represented, or represented such that folded states can be recognized.

An image processing program of the present invention causes a computer to function as the image processing apparatus of the present invention.

The image processing apparatus and the image processing program of the present invention set arrangements of a plurality of pieces of manuscript data within sheets in the case that the plurality of pieces of manuscript data are printed onto the sheets and the printed sheets are divided and folded into N (N represents a natural number greater than or equal to 2) equally sized divisions, by: obtaining the sizes of the pieces of manuscript data; obtaining a first reference size, which is set based on a unit size equal to the size of the sheets divided into the N divisions, and M reference sizes, which are set based on sizes which are the unit size multiplied by M (M represents natural numbers greater than or equal to 2 and less than or equal to N); arranging pieces of manuscript data having sizes less than or equal to the first reference size at single surfaces from among a plurality of surfaces which are formed on printing surfaces of the sheets by the sheets being folded, and arranging pieces of manuscript data having sizes greater than an (M−1)th reference size and less than or equal to an Mth reference size at M continuous surfaces from among the plurality of surfaces, to set the arrangement of the plurality of pieces of manuscript data within the sheets. Therefore, each piece of manuscript data can be arranged at regions of the sheets suited to the sizes thereof.

A configuration may be adopted, wherein in the case that a blank surface is generated by the arrangement setting section arranging the plurality of pieces of manuscript data in the order that they are arranged, the order that the pieces of manuscript data are arranged is changed and arrangement is performed such that one of the pieces of manuscript data is arranged in the blank surface. In this case, the printing surfaces can be utilized more efficiently.

A configuration may be adopted, wherein preview images that represent states in which the plurality of pieces of manuscript data are arranged on the printing surfaces according to the set arrangement of the plurality of pieces of manuscript data are generated, and the generated preview images are displayed by the display section. In this case, users are enabled to confirm the appearance of printed matter which will be generated in the case that printing is executed.

A configuration may be adopted, wherein operation commands from users regarding the displayed preview images are received; the arrangement of the plurality of pieces of manuscript data is changed according to the received operation commands; preview images that reflect the change to the arrangement are generated; and the newly generated preview images are displayed. In this case, users are enabled to change the automatically set arrangements of the pieces of manuscript data easily. In addition, users are enabled to confirm the appearance of printed matter having the changed arrangement which will be generated prior to printing being executed. Thereby, printed matter having arrangements of pieces of manuscript data desired by users can be easily generated.

DESCRIPTION OF THE PREFERRED EMBODIMENTS

Figure 1:
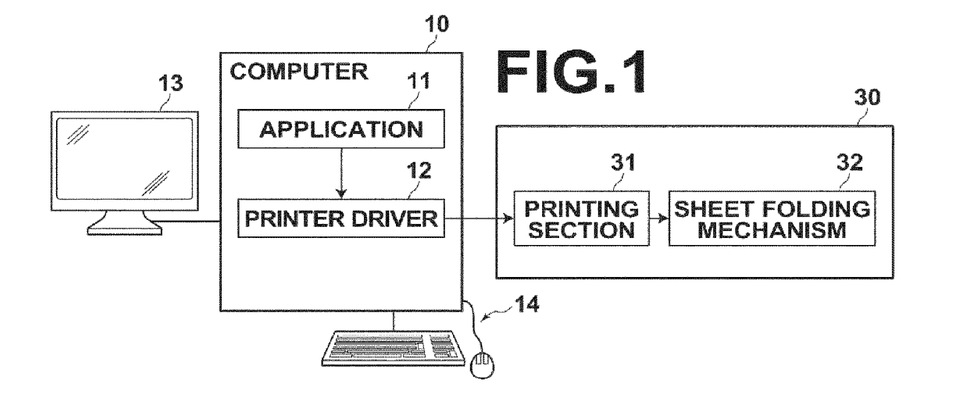
FIG. 1 is a schematic diagram that illustrates a printing system.

Hereinafter, an embodiment of the image processing apparatus and the image processing program of the present invention will be described with reference to the attached drawings. FIG. 1 is a block diagram that schematically illustrates the configuration of a printing system that employs the image processing apparatus of the present invention. As illustrated in FIG. 1, the printing system is equipped with: a computer 10; and a printing apparatus 30 which is connected to the computer 10 via a network such as a wired or wireless LAN.

The printing apparatus 30 is equipped with a printing section 31 and a sheet folding mechanism 32. The printing section 31 performs printing onto sheets based on input print data. The printing section may be that which performs stencil printing, ink jet printing, or laser printing onto sheets.

The sheet folding mechanism is a so called finisher, and folds sheets, onto which printing has been performed by the printing section 31, into inner third folds or outer third folds (Z folds). Folding into inner third folds is a folding method in which a sheet is divided into three parts, which are an upper part, a middle port, and a lower part, then the front surfaces of the upper part and the lower part are folded toward the middle part. Folding into outer third folds is a folding method in which the front surface of the upper part is folded toward the front surface of the middle part and the back surface of the lower part is folded toward the back surface of the middle part. Note that the mechanical configuration of finishers such as the sheet folding mechanism 32 is known, and therefore a detailed description thereof will be omitted.

The computer 10 is equipped with hardware, such as a central processing unit (CPU) and a storage device constituted by a semiconductor memory, a hard disk, an SSD, etc. Programs, such as an application 11 for generating manuscript data and a printer driver 12 that generates print data recognizable by the printing apparatus 30 based on the manuscript data generated by the application 11, are installed in the computer 10. Here, the printer driver 12 corresponds to the image processing program of the present invention, and the computer 10 in which the printer driver 12 is installed corresponds to the image processing apparatus of the present invention. In addition, the computer 10 is also equipped with a display section 13 such as a monitor, and an operating section 14 constituted by a keyboard, a mouse, etc.

The application 11 is a program capable of generating manuscript data Di (i=1, 2, . . . ) such as Notepad and MS Word™. Manuscript data Di which are generated by the application 11 is output to the printer driver 12.

The printer driver 12 has a user interface for receiving user input regarding various printing conditions and output formats, such as paper size, number of copies, single sided/double sided printing, and sheet folding conditions, such as the aforementioned third fold. The printer driver 12 generates print data which are recognizable by the printing apparatus 30 based on the manuscript data Di output from the application 11 and the input printing conditions, and outputs the print data. Examples of print data generated by the printer driver include PDL (Page Description Language) data and raster data.

Figure 2:
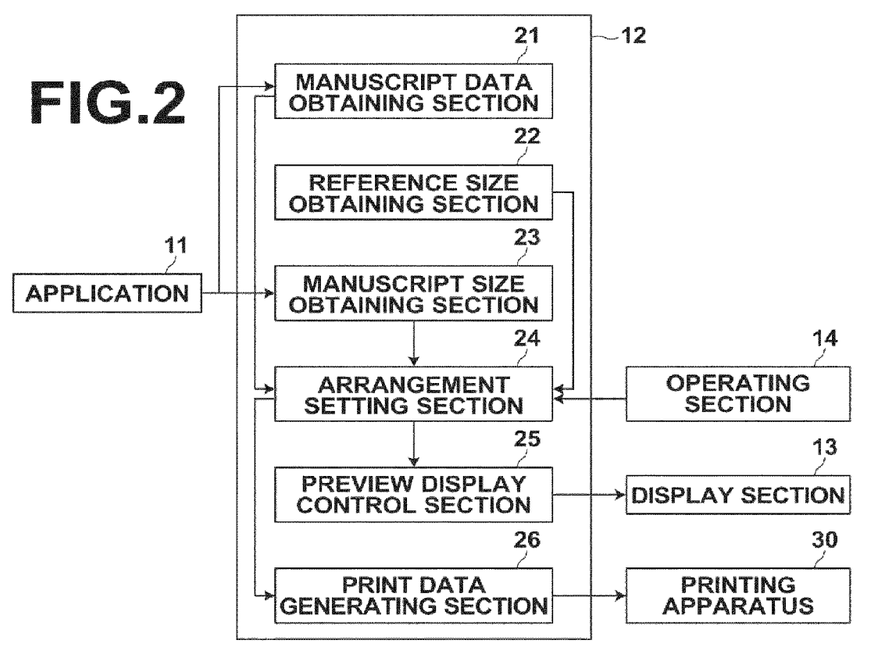
FIG. 2 is a block diagram that illustrates the configuration of a printer driver of the printing system illustrated in FIG. 1.

FIG. 2 is a block diagram that shows the configuration of the printer driver of the present embodiment in greater detail. As illustrated in FIG. 2, the printer driver 12 is equipped with: a manuscript data obtaining section 21; a reference size obtaining section 22; a manuscript size obtaining section 23; an arrangement setting section 24; a preview display control section 25; and a print data generating section 26.

The manuscript data obtaining section 21 obtains a plurality of pieces of manuscript data Di, which are generated by the application 11.

The reference size obtaining section 22 stores a table, in which each of a plurality of paper sizes is correlated to a first reference size, a second reference size, and a third reference size set based on the paper size, in the memory of the computer 10 in advance. The reference size obtaining section 22 refers to the table, to read out and obtain a first reference size, a second reference size, and a third reference size which are correlated to the paper size of sheets to be utilized for a printing operation. Note that the reference size obtaining section 22 may alternatively calculate a first reference size, a second reference size, and a third reference size based on the input paper size.

Here, the first reference size is the maximum value of the size of manuscript data to be printed onto one of a plurality of surfaces which are formed on the surfaces of sheets by the sheets being folded into thirds. The first reference size is set based on a unit size, which is the size of the sheet divided into three equal divisions. The second reference size is the maximum value of the size of manuscript data to be printed onto two of the surfaces. The second reference size is set based on a size twice the unit size. The third reference size is the maximum value of the size of manuscript data to be printed onto two of the surfaces. The third reference size is set based on a size three times the unit size.

For example, in the case that the paper size is A4, the first reference size (x1·y1) may be set to a unit size of 210 mm horizontally·99 mm vertically, which is a third of the size of the sheet. The second reference size (x2·y2) may be set to 210 mm horizontally·198 mm vertically, which is twice the unit size. The third reference size (x3·y3) may be set to 210 mm horizontally·297 mm vertically, which is three times the unit size.

Figure 3:
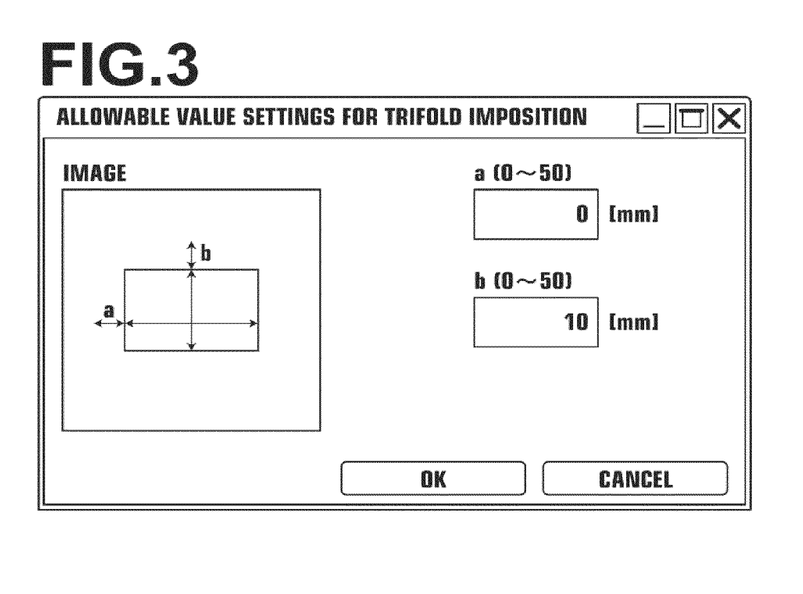
FIG. 3 is a diagram that illustrates a setting screen for receiving settings of variables employed to set a reference size.

Alternatively, in the case that the paper size is A4, the first reference size (x1·y1) may be (210+a) mm horizontally·(99+b) vertically, which is the unit size to which predetermined values a and b are added. The second reference size (x1·y1)

may be (210+a) mm horizontally·(198+b) mm vertically, which is twice the unit size to which the predetermined values a and b are added. The second reference size (x1·y1) may be (210+a) mm horizontally·(297+b) mm vertically, which is twice the unit size to which the predetermined values a and b are added. Here, the predetermined values a and b may be set by causing the display section 13 to display a setting screen as illustrated in FIG. 3, and prompting a user to input settings. Values of −50 mm or greater and 50 mm or less may be set as the values of a and b, for example.

The manuscript size obtaining section 23 obtains the size of each piece of manuscript data Di from the application 11. Here, the sizes of the pieces of manuscript data Di refer to the lengths wi in the horizontal direction and the lengths hi in the vertical direction of the pieces of manuscript data Di, which are set when the application generates the pieces of manuscript data Di.

The arrangement setting section 24 sets the arrangements of the plurality of pieces of manuscript data Di (i=1, 2, . . . ) obtained by the manuscript data obtaining section 21 with respect to the sheets which are to be folded into thirds.

The arrangement setting section 24 first determines the number of surfaces in which pieces of manuscript data are to be arranged. To do so, the arrangement setting section compares the lengths wi in the horizontal direction and the lengths hi in the vertical direction of the pieces of manuscript data Di obtained by the manuscript size obtaining section 23 against the first reference size (x1·y1), the second reference size (x2·y2) and the third reference size (x3·y3) obtained by the reference size obtaining section 22.

Specifically, in the case that wi≤x1 and hi≤y1, the size of a piece of manuscript data Di is judged to be a single surface size, and the number of surfaces to be utilized in the arrangement of the piece of manuscript data D1 is determined to be 1. In the case that wi≤x2 and hi≤y2, the size of a piece of manuscript data Di is judged to be a double surface size, and the number of surfaces to be utilized in the arrangement of the piece of manuscript data D1 is determined to be 2. In the case that wi≤x3 and hi≤y3, the size of a piece of manuscript data Di is judged to be a triple surface size, and the number of surfaces to be utilized in the arrangement of the piece of manuscript data D1 is determined to be 3.

Next, the arrangement setting section 24 arranges the plurality of pieces of manuscript data Di (i=1, 2, . . . ) obtained by the manuscript data obtaining section 21 within the plurality of surfaces formed on the printing surfaces of sheets by the sheets being folded into thirds, in the order of arrangement thereof. At this time, pieces of manuscript data which have been judged to be of a single surface size in the above judgment process are arranged within single surfaces from among the plurality of surfaces formed by the sheets being folded into thirds. Pieces of manuscript data which have been judged to be of a double surface size are arranged within two continuous surfaces among the plurality of surfaces, and pieces of manuscript data which have been judged to be of a triple surface size are arranged within three continuous surfaces among the plurality of surfaces.

Figure 4:
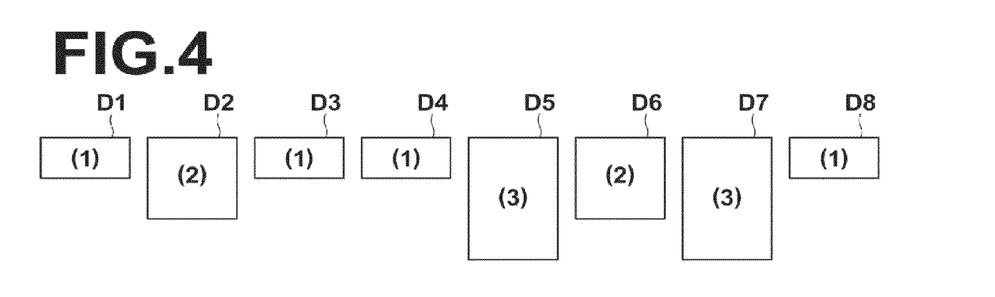
FIG. 4 is a diagram that illustrates examples of pieces of manuscript data.

Here, a case will be considered in which a plurality of pieces of manuscript data D1, D2, . . . D8 as illustrated in FIG. 4 are sequentially arranged on a plurality of printing surfaces, for example. The pieces of manuscript data D1, D3, D4, and D8 are single surface size, the pieces of manuscript data D2 and D6 are double surface size, and the pieces of manuscript data D5 and D7 are triple surface size.

Figure 5:
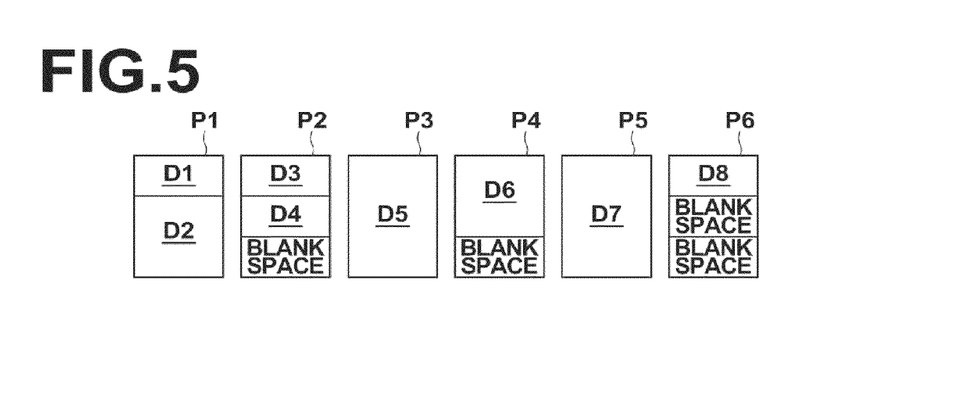
FIG. 5 is a first diagram that illustrates examples of arrangements of pieces of manuscript data with respect to printing surfaces.

As illustrated in FIG. 5, first, the single surface sized piece of manuscript data D1 is arranged in the first surface (the upper portion) of a first printing surface P1, and the double surface sized piece of manuscript data D2 is arranged in the second and third surfaces (the middle portion and the lower portion) of the printing surface P1. After the pieces of manuscript data are arranged in this manner, there are no more surfaces left in which pieces of manuscript data can be arranged on the printing surface P1. Therefore, arrangement of pieces of manuscript data is performed with respect to a next printing surface P2. The single surface sized piece of manuscript data D3 is arranged in the first surface (the upper portion) of the second printing surface P2, and the single surface sized piece of manuscript data D4 is arranged in the second surface (the middle portion) of the printing surface P2.

Next, when the triple surface sized piece of manuscript data D5 is to be arranged, three continuous surfaces are necessary to arrange the piece of manuscript data D5. However, only the third surface (the lower portion) remains as a surface in which manuscript data can be arranged on the printing surface P2. Therefore, the remaining surface is left blank, and the piece of manuscript data D5 is arranged within the first through third surfaces of a next printing surface P3. Next, the double surface sized piece of manuscript data D6 is arranged within the first and second surfaces of a printing surface P4. Thereafter, the third surface of the printing surface P4 is left blank, and the triple surface sized piece of manuscript data D7 is arranged in the first through third surfaces of a printing surface P5. Finally, the single surface sized piece of manuscript data D8 is arranged in the first surface (the upper portion) of a printing surface P6, and the remaining two surfaces are left blank.

Figure 6A:
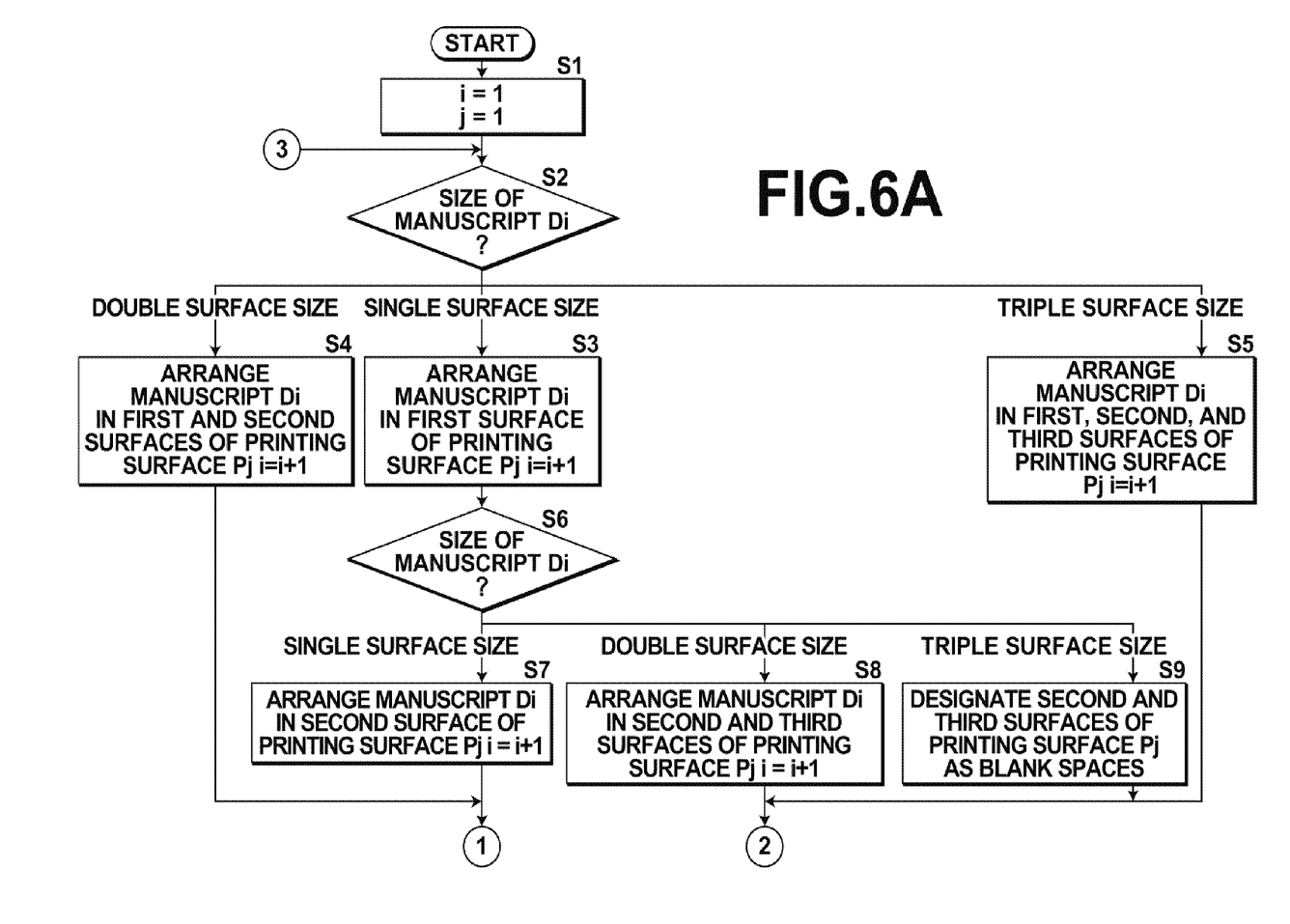
FIG. 6A is a flow chart that illustrates the steps of an arrangement process for arranging pieces of manuscript data.
Figure 6B:
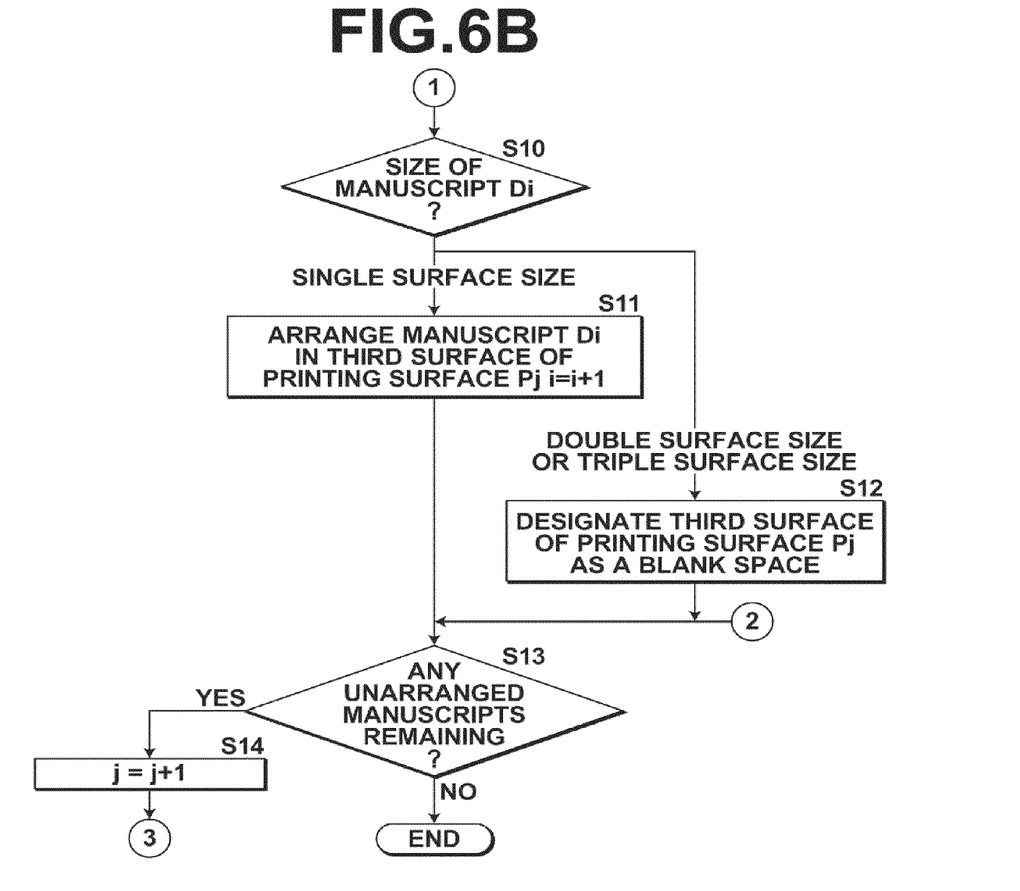
FIG. 6B is a flow chart that illustrates the steps of an arrangement process for arranging pieces of manuscript data.

Next, the flow of processes performed by the arrangement setting section 24 will be described with reference to the flowcharts of FIG. 6A and FIG. 6B. First, variables i and j are initialized to a value of 1 (S1). Next, the size of a piece of manuscript data Di is judged (S2, i=1). In the case that the size of the piece of manuscript data Di judged at step S2 is a single surface size, the process proceeds to step S3. In the case that the size of the piece of manuscript data Di judged at step S2 is a double surface size, the process proceeds to step S4. In the case that the size of the piece of manuscript data Di judged at step S2 is a triple surface size, the process proceeds to step S5. At step S4, the piece of manuscript data Di is arranged in the first and second surfaces of a printing surface Pj, the value of i is increased by 1 (S4), and the process proceeds to step S10. At step S5, the piece of manuscript data Di is arranged in the first through third surfaces of a printing surface Pj, the value of i is increased by 1 (S5), and the process proceeds to step S13.

At step S3, the piece of manuscript data Di is arranged in the first surface of the printing surface Pj, and the value of i is increased by 1 (S3). Next, the size of a next piece of manuscript data Di is judged (S6). In the case that the size of the piece of manuscript data Di judged at step S6 is a single surface size, the process proceeds to step S7. In the case that the size of the piece of manuscript data Di judged at step S6 is a double surface size, the process proceeds to step S8. In the case that the size of the piece of manuscript data Di judged at step S6 is a triple surface size, the process proceeds to step S9. At step S8, the piece of manuscript data Di is arranged in the second and third surfaces of the printing surface Pj, the value of i is increased by 1 (S8), and the process proceeds to step S13. At step S9, the second and third surfaces of the printing surface Pj are left blank (S9) and the process proceeds to step S13.

At step S7, the piece of manuscript data D1 is arranged in the second surface of the printing surface Pj, and the value of i is increased by 1 (S7). Next, the size of a next piece of manuscript data Di is judged (S10). In the case that the size of the piece of manuscript data Di judged at step S10 is a single surface size, the process proceeds to step S11. In the case that the size of the piece of manuscript data Di judged at step S6 is a double surface size or a triple surface size, the process proceeds to step S12. At step S12, the second and third surfaces of the printing surface Pj are left blank (S12) and the process proceeds to step S13. At step S11, the piece of manuscript data Di is arranged in the third surface of the printing surface Pj, and the value of i is increased by 1 (S11). Then, whether pieces of manuscript data which have not been arranged yet exist is judged (S13). In the case that it is judged at step S13 that there are pieces of manuscript data which have not been arranged yet, the value of j is increased by 1 (S14), and the process returns to step S2. On the other hand, in the case that it is judged at step S13 that there are no more pieces of manuscript data which have not been arranged yet, the process ends.

Note that the arrangement setting section 24 may change the order that the pieces of manuscript data are arranged and perform arrangement such that one of the pieces of manuscript data is arranged in blank surfaces, in the case that blank surfaces are generated by the arrangement setting section arranging the plurality of pieces of manuscript data in the order that they are arranged.

Specifically, if a blank surface is generated within an arrangement when a plurality of pieces of manuscript data are arranged in order within a plurality of printing surfaces and the number of surfaces necessary to arrange a piece of manuscript data is greater than the number of remaining surfaces on a current printing surface, a piece of manuscript data within a predetermined range of arrangement order from the piece of manuscript data that utilizes a number of surfaces less than or equal to the number of surfaces remaining on the current printing surface is searched for. If a piece of manuscript data satisfying the above condition is found, the found piece of manuscript data is arranged in the blank surface of the current printing surface. The search process may be performed at step S9 and step S12 of the flow charts of FIG. 6A and FIG. 6B.

Figure 7:
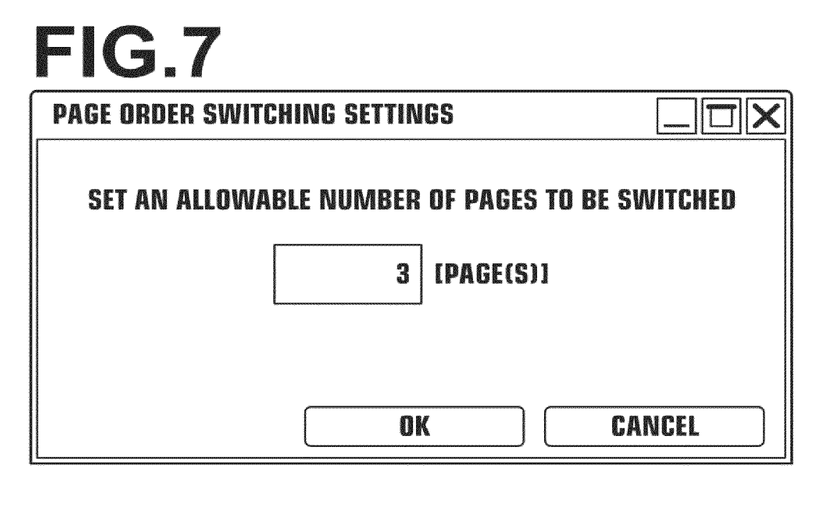
FIG. 7 is a diagram that illustrates a setting screen for receiving settings of an allowable range of changes to arrangement orders of manuscript pages.

Here, the predetermined range (a range within which the arrangement order of manuscript pages can be changed) may be set by displaying a setting screen such as that illustrated in FIG. 7 on the display section 13, and by prompting an operator to perform input operations therein. Note that the predetermined range may be set to approximately 3, for example.

Figure 8:
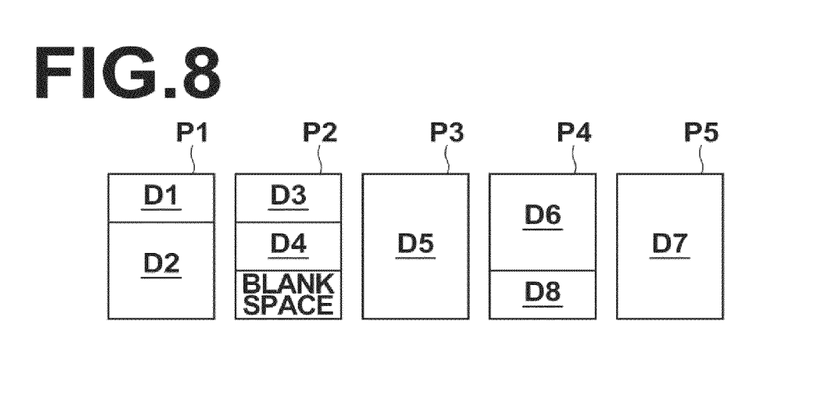
FIG. 8 is a second diagram that illustrates examples of arrangements of pieces of manuscript data with respect to printing surfaces.

According to the arrangement method above, the pieces of manuscript data D1, D2, . . . D8 can be arranged within printing surfaces P1 through P5, as illustrated in FIG. 8. In the arrangement of FIG. 8, the piece of manuscript data D8 is arranged in the third surface of printing surface P4, which is a position prior to that of the piece of manuscript data D7. Thereby, printing surface P6 is obviated, and therefore, printing surfaces can be utilized more efficiently.

Note that in the case that double sided printing is to be performed onto sheets to be folded into thirds, six pieces of manuscript data are obtained by the manuscript data obtaining section 21, and the size of all of the pieces of manuscript data is a single surface size, the arrangement setting section 24 may arrange the pieces of manuscript data in predetermined arrangement formats which are correlated in advance to sheet folding conditions and the like.

Figure 9:
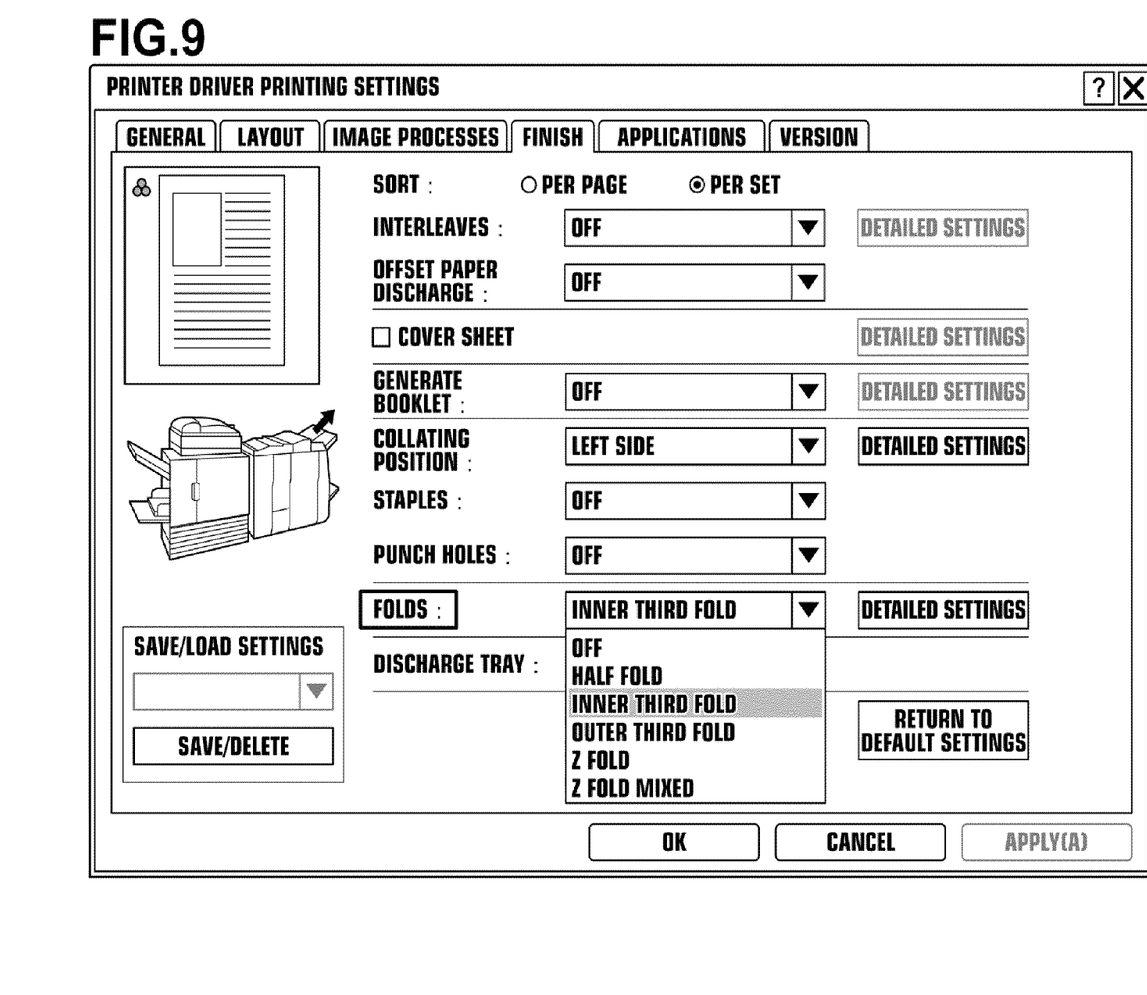
FIG. 9 is a diagram that illustrates a setting screen for receiving settings of printing conditions, sheet folding conditions, discharge tray, etc.
Figure 10:
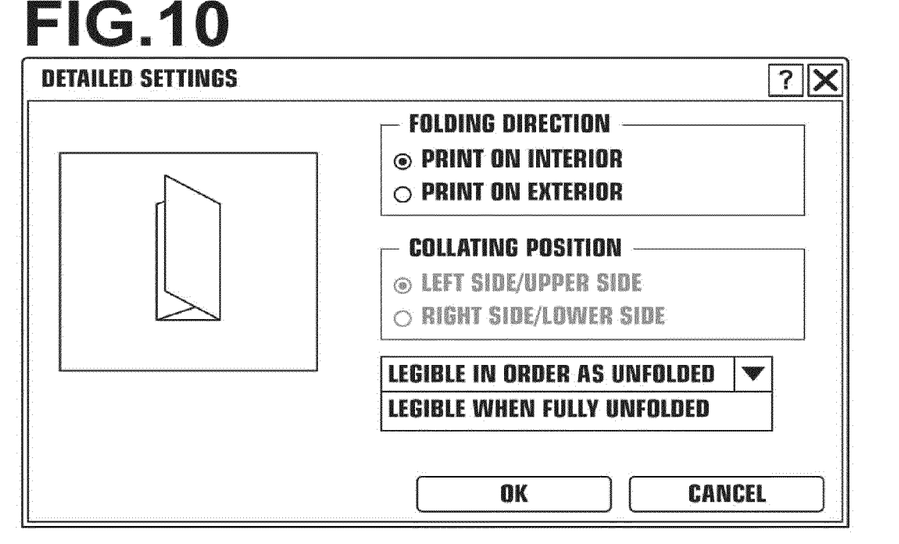
FIG. 10 is a diagram that illustrates a setting screen for receiving settings of folding directions of sheets, arrangement methods of manuscripts, etc.

The sheet folding conditions may be set by displaying setting screens such as those illustrated in FIG. 9 and FIG. 10 on the display section 13, and by prompting an operator to perform input operations therein. FIG. 9 is a setting screen for receiving operator settings regarding various printing conditions, sheet folding conditions, discharge tray, etc. FIG. 10 is a setting screen for receiving settings regarding the folding direction of sheets, the manuscript arrangement method, etc., in the case that "INNER THIRD FOLD" is selected in the "FOLDS" pull down menu of FIG. 9.

Figure 11:
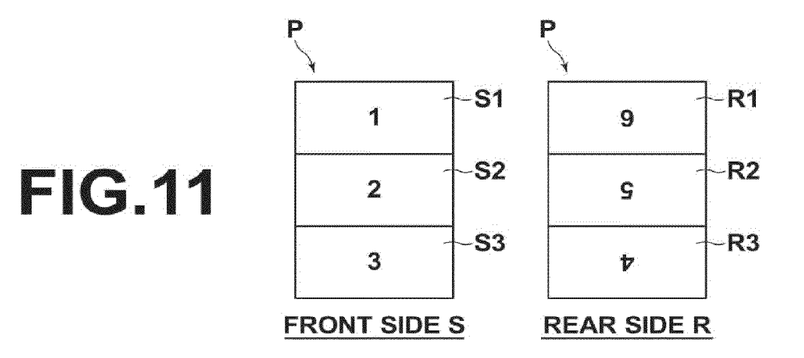
FIG. 11 is a diagram that illustrates a manner of arrangement of pieces of manuscript data associated with an "outer third fold".

For example, in the case that "OUTER THIRD FOLD" is selected in the "FOLDS" pull down menu of FIG. 9, pieces of manuscript data may be arranged in the order of: an upper portion S1 of the front side S of a sheet P; a middle portion S2; a lower portion S3; then a lower portion R3 of the rear side R of the sheet P; a middle portion R2; and finally an upper portion R1, as illustrated in FIG. 11.

Figure 12:
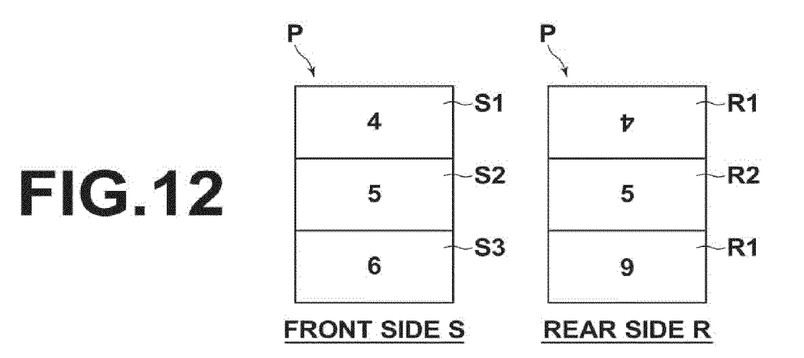
FIG. 12 is a diagram that illustrates a manner of arrangement of pieces of manuscript data associated with an "inner third fold" and "print on inner side".

In the case that "INNER THIRD FOLD" is selected in the "FOLDS" pull down menu of FIG. 9 and the radio button for "PRINT ON INTERIOR" is checked in the setting screen of FIG. 10, pieces of manuscript data may be arranged in the order of: the upper portion S1 of the front side S of the sheet P; the middle portion S2; the lower portion S3; then the upper portion R1 of the rear side R of the sheet P; the middle portion R2; then the lower portion R3, as illustrated in FIG. 12. At this time, the pieces of manuscript data to be arranged within the upper portion R1 and the lower portion R3 of the rear side R are arranged in a state in which they are rotated 180 degrees. This is to facilitate visual discernment of the contents of the printed manuscripts when the upper and lower portions of the sheet P are folded inward and also when the upper portion is opened and the lower portion remains folded inward.

Figure 13:
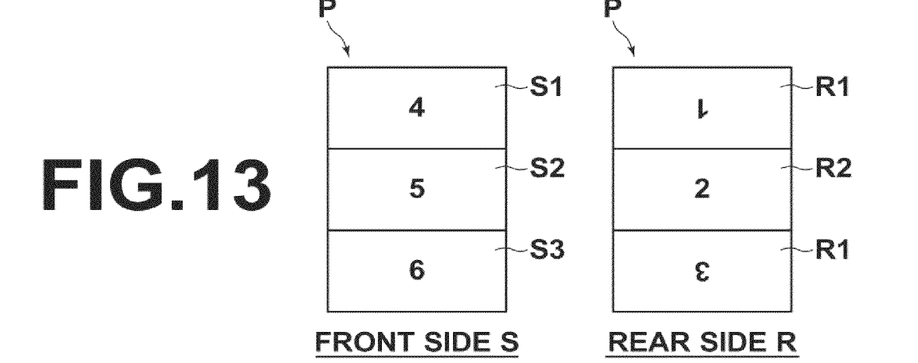
FIG. 13 is a diagram that illustrates a manner of arrangement of pieces of manuscript data associated with an "inner third fold" and "print on outer side".

In the case that "INNER THIRD FOLD" is selected in the "FOLDS" pull down menu of FIG. 9 and the radio button for "PRINT ON EXTERIOR" is checked in the setting screen of FIG. 10, pieces of manuscript data may be arranged in the order of: the upper portion R1 of the rear side R of the sheet P; the middle portion R2; the lower portion R3; then the upper portion S1 of the front side S of the sheet P; the middle portion S2; then the lower portion S3, as illustrated in FIG. 13. At this time, the pieces of manuscript data to be arranged within the upper portion R1 and the lower portion R3 of the rear side R are arranged in a state in which they are rotated 180 degrees.

Figure 14:
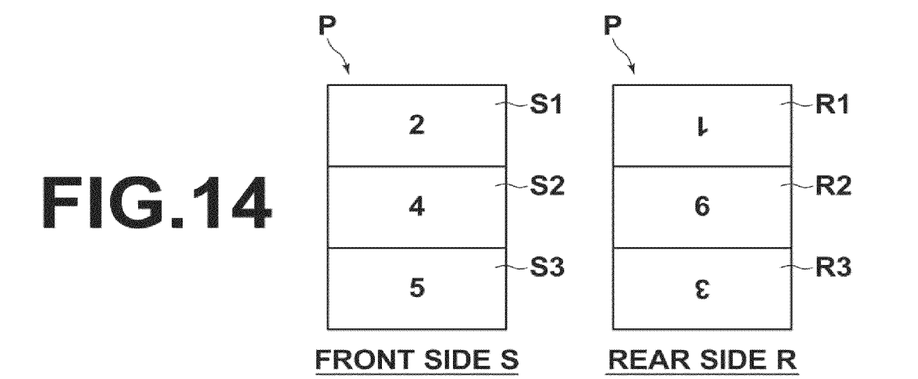
FIG. 14 is a diagram that illustrates a manner of arrangement of pieces of manuscript data associated with an "inner third fold", "print on outer side", and "legible in order as unfolded".

In the case that "INNER THIRD FOLD" is selected in the "FOLDS" pull down menu of FIG. 9, the radio button for "PRINT ON EXTERIOR" is checked in the setting screen of FIG. 10, and "LEGIBLE IN ORDER AS UNFOLDED" is selected in the pull down menu in the setting screen of FIG. 10, pieces of manuscript data may be arranged in the order of: the upper portion R1 of the front side R of the sheet P; the upper portion S1 of the front side S of the sheet P; the lower portion R3 of the rear side R; the middle portion S2 of the front side S; the lower portion S3; then the middle portion R2 of the rear side R, as illustrated in FIG. 14. At this time, the pieces of manuscript data to be arranged within the upper portion R1 and the lower portion R3 of the rear side R are arranged in a state in which they are rotated 180 degrees.

Figure 15:
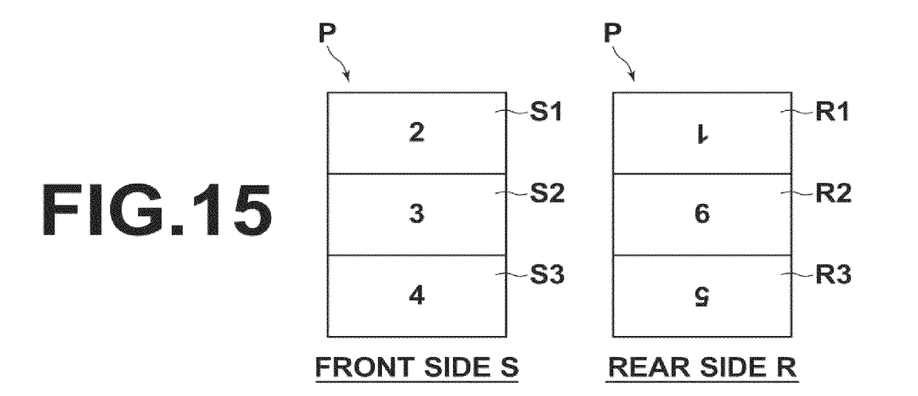
FIG. 15 is a diagram that illustrates a manner of arrangement of pieces of manuscript data associated with an "inner third fold", "print on outer side", and "legible when fully unfolded".
Figure 16:
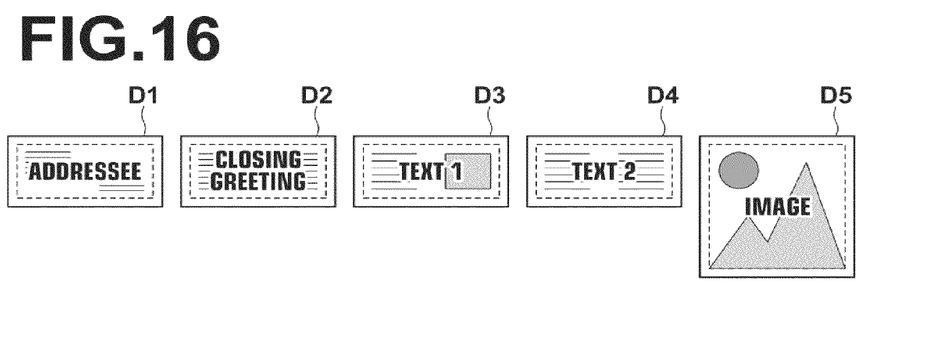
FIG. 16 is a diagram that illustrates examples of pieces of manuscript data.
Figure 17:
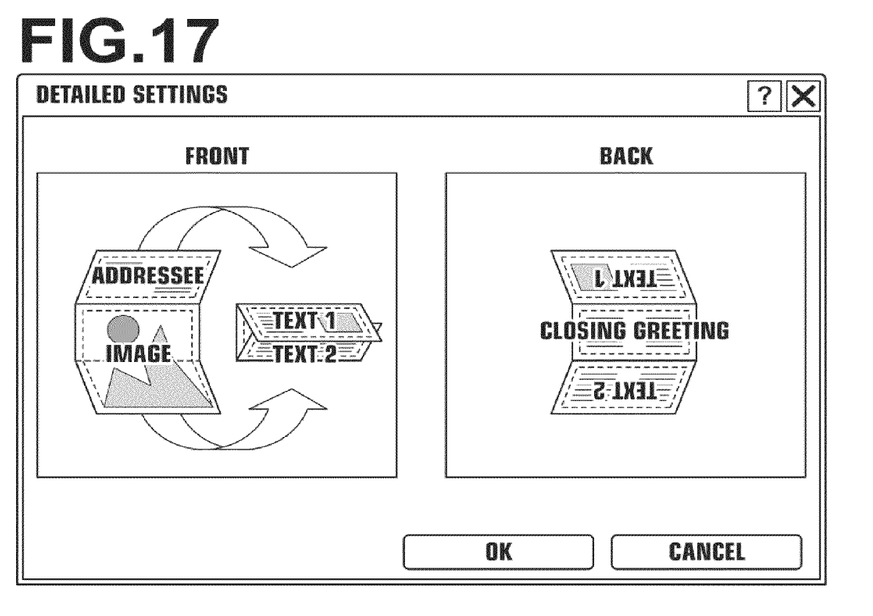
FIG. 17 is a diagram that illustrates a preview image.

In the case that "INNER THIRD FOLD" is selected in the "FOLDS" pull down menu of FIG. 9, the radio button for "PRINT ON EXTERIOR" is checked in the setting screen of FIG. 10, and "LEGIBLE WHEN FULLY UNFOLDED" is selected in the pull down menu in the setting screen of FIG. 10, pieces of manuscript data may be arranged in the order of: the upper portion R1 of the front side R of the sheet P; the upper portion S1 of the front side S of the sheet P; the middle portion S2; the lower portion S3; the middle portion R2 of the rear side R; then the lower portion R3, as illustrated in FIG. 15. At this time, the pieces of manuscript data to be arranged within the upper portion R1 and the lower portion R3 of the rear side R are arranged in a state in which they are rotated 180 degrees.

In addition, the arrangement setting section 24 compares the size of each piece of manuscript data obtained by the manuscript size obtaining section 23 against the sizes of regions (hereinafter, referred to as arrangement target regions) on the printing surface at which the pieces of manuscript data are to be arranged. In cases that the sizes are different, expansion/reduction processes are administered on the pieces of manuscript data while maintaining the aspect ratio thereof. In the case that the size of a piece of manuscript data is greater than the size of a arrangement target region, a reduction process is administered onto the piece of manuscript data such that it will fit within the arrangement target region. In the case that the size of a piece of manuscript data is less than the size of a arrangement target region, an expansion process is administered onto the piece of manuscript data up to a size that will fit within the arrangement target region.

In addition, the arrangement setting section 24 arranges each piece of manuscript data to be positioned at the centers of arrangement target regions, to be positioned such that the upper left corners of the pieces of manuscript data are at the upper left corners of arrangement target regions, etc., according to preset arrangement methods.

Further, the arrangement setting section 24 further has a function to change the arrangement of pieces of manuscript data according to input commands, in the case that user input to change the arrangement of the pieces of manuscript data are received via the operating section 14.

Figure 18:
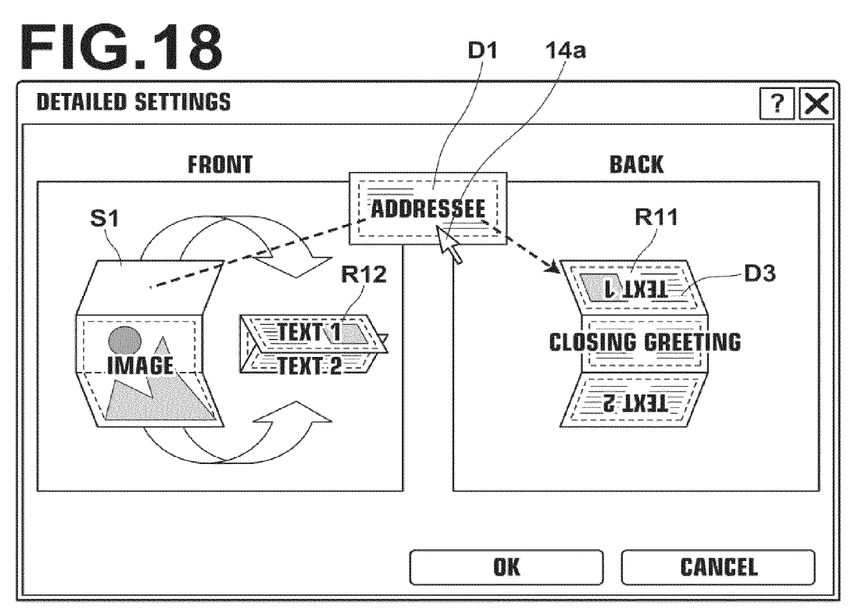
FIG. 18 is a diagram for explaining changes to arrangements of pieces of manuscript data by a user.
Figure 19:
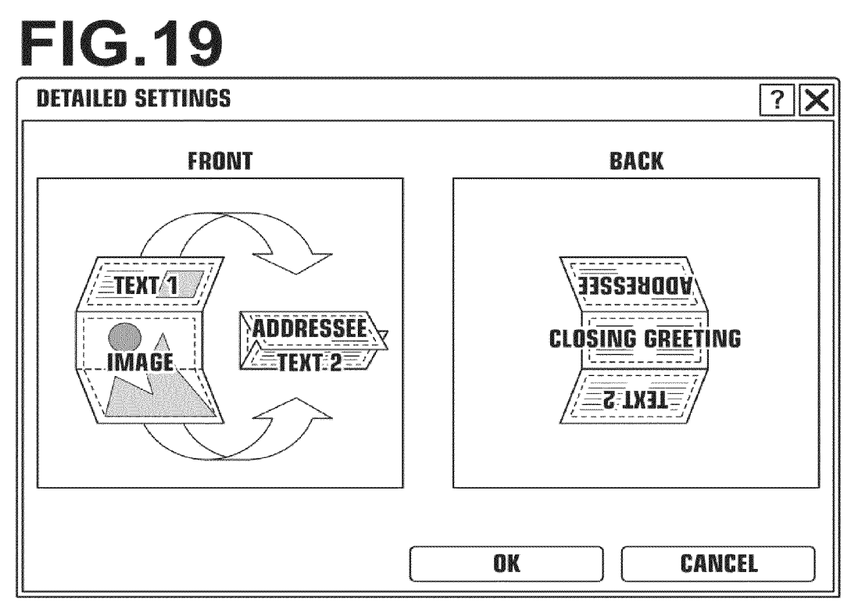
FIG. 19 is a diagram that illustrates a preview image that reflects changes to arrangements.

In the case that an operation to drag and drop a piece of manuscript data D1 from the upper portion S1 of the front side S to the upper portion R11 (or R12) of a rear side R as illustrated in FIG. 18, for example, the preview display control section 25 generates a preview image in which the arrangement positions of the piece of manuscript data D1 and the piece of manuscript data D3 are switched as illustrated in FIG. 19, and displays the generated preview image on the display section 13.

The print data generating section 26 generates PDL data, in which imposition is performed onto each region of sheets folded into inner third folds, as print data, based on the arrangement of pieces of manuscript data on printing surfaces set by the arrangement setting section 24, or based on the arrangement of pieces of manuscript data as changed by the preview display control section in the case that such changes are implemented. Then, the print data generating section 26 outputs the generated print data to the printing apparatus 30.

The present printing system having the configuration described above sets arrangements of a plurality of pieces of manuscript data within sheets in the case that the plurality of pieces of manuscript data are printed onto the sheets and the printed sheets are divided and folded into three equally sized divisions, by: the manuscript size obtaining section 23 obtaining the sizes of the pieces of manuscript data; the reference size obtaining section 22 obtaining a first reference size, which is set based on a unit size equal to the size of the sheets divided into the three divisions, a second reference size, which is set based on a size twice the unit size, and third reference size, which is set based on a size three times the unit size; and the arrangement setting section 24 arranging pieces of manuscript data having sizes less than or equal to the first reference size at single surfaces from among a plurality of surfaces which are formed on printing surfaces of the sheets by the sheets being folded, arranging pieces of manuscript data having sizes greater than the first reference size and less than or equal to the second reference size at two continuous surfaces from among the plurality of surfaces, and arranging pieces of manuscript data having sizes greater than the second reference size and less than or equal to the third reference size at three continuous surfaces from among the plurality of surfaces, to set the arrangement of the plurality of pieces of manuscript data within the sheets. Therefore, each piece of manuscript data can be arranged at regions of the sheets suited to the sizes thereof.

Note that the above embodiment was described as a case in which the manuscript size obtaining section, the reference size obtaining section, the arrangement setting section, and the preview display control section are installed in a computer. Alternatively, a configuration may be adopted in which a portion or all of these components are installed in the printing apparatus 30.

In addition, the above embodiment was described as a case in which the image processing apparatus and the image processing program of the present invention are applied to printing onto sheets that are folded in thirds. However, the present invention is not limited to cases in which printing is performed onto sheets that are folded in thirds. The present invention may be applied to other cases in which printing is performed onto sheets that are divided into a plurality of surfaces having approximately the same sizes, such as half fold printing, quarter fold printing, and fifth fold printing.

What is claimed is:

1. An image processing apparatus that sets arrangements of a plurality of pieces of manuscript data within sheets in the case that the plurality of pieces of manuscript data are printed onto the sheets and each of the printed sheets is folded into N (N represents a natural number greater than or equal to 2) equally sized divisions, comprising:
a manuscript size obtaining section that obtains the sizes of the pieces of manuscript data;
a reference size obtaining section that obtains a first reference size, which is set based on a unit size equal to the size of one of the N equally sized divisions, and Mth reference sizes, which are set based on a size obtained by multiplying the unit size by M (M represents natural numbers greater than or equal to 2 and less than or equal to N); and
an arrangement setting section that arranges pieces of manuscript data having sizes, obtained by the manuscript size obtaining section, less than or equal to the first reference size at single surfaces from among a plurality of surfaces which are formed on printing surfaces of the sheets by the sheets being folded, and arranges pieces of manuscript data having sizes, obtained by the manuscript size obtaining section, greater than an (M−1)th reference size and less than or equal to an Mth reference size at M continuous surfaces from among the plurality of surfaces, to set the arrangement of the plurality of pieces of manuscript data within the sheets.

2. An image processing apparatus as defined in claim 1, wherein:
the arrangement setting section is that which changes the order that the pieces of manuscript data are arranged and performs arrangement such that one of the pieces of manuscript data is arranged in blank surfaces, in the case that blank surfaces, in which manuscript data are not arranged, are generated by the arrangement setting section arranging the plurality of pieces of manuscript data in their sequential order.

3. An image processing apparatus as defined in claim 1, further comprising:
a display section that displays preview images; and
a preview image display control section that generates the preview images that represent states in which the plurality of pieces of manuscript data are arranged on the printing surfaces according to the arrangement of the plurality of pieces of manuscript data set by the arrangement setting section and controls the display section such that the generated preview images are displayed by the display section.

4. An image processing apparatus as defined in claim 3, further comprising:

an operating section for receiving operation commands from users regarding the displayed preview images; wherein:

the arrangement setting section changes the arrangement of the plurality of pieces of manuscript data within the sheets according to the operation commands of the users received by the operating section; and the preview display control section generates preview images that reflect the change to the arrangement and causes the display section to display the newly generated preview images.

5. A non transitory computer readable recording medium having an image processing program that causes a computer to function as an image processing apparatus that sets arrangements of a plurality of pieces of manuscript data within sheets in the case that the plurality of pieces of manuscript data are printed onto the sheets and the printed sheets are divided and folded into N (N represents a natural number greater than or equal to 2) equally sized divisions stored therein, the program causing the computer to function as:

a manuscript size obtaining section that obtains the sizes of the pieces of manuscript data;

a reference size obtaining section that obtains a first reference size, which is set based on a unit size equal to the size of the sheets divided into the N divisions, and M reference sizes, which are set based on sizes which are the unit size multiplied by M (M represents natural numbers greater than or equal to 2 and less than or equal to N); and an arrangement setting section that arranges pieces of manuscript data having sizes, obtained by the manuscript size obtaining section, less than or equal to the first reference size at single surfaces from among a plurality of surfaces which are formed on printing surfaces of the sheets by the sheets being folded, and arranges pieces of manuscript data having sizes, obtained by the manuscript size obtaining section, greater than an (M−1)th reference size and less than or equal to an Mth reference size at M continuous surfaces from among the plurality of surfaces, to set the arrangement of the plurality of pieces of manuscript data within the sheets.

* * * * *